Sept. 11, 1928.
T. S. MILLER
1,684,063
FLUID PRESSURE OPERATED DEVICE
Filed Aug. 1, 1924  2 Sheets-Sheet 1
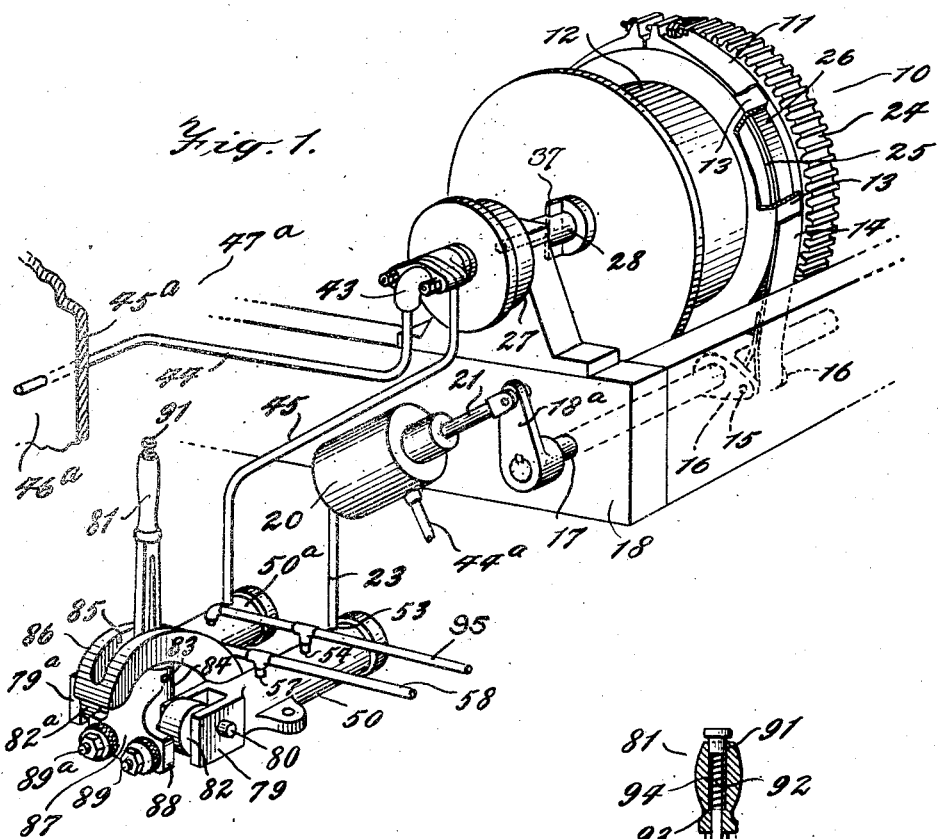
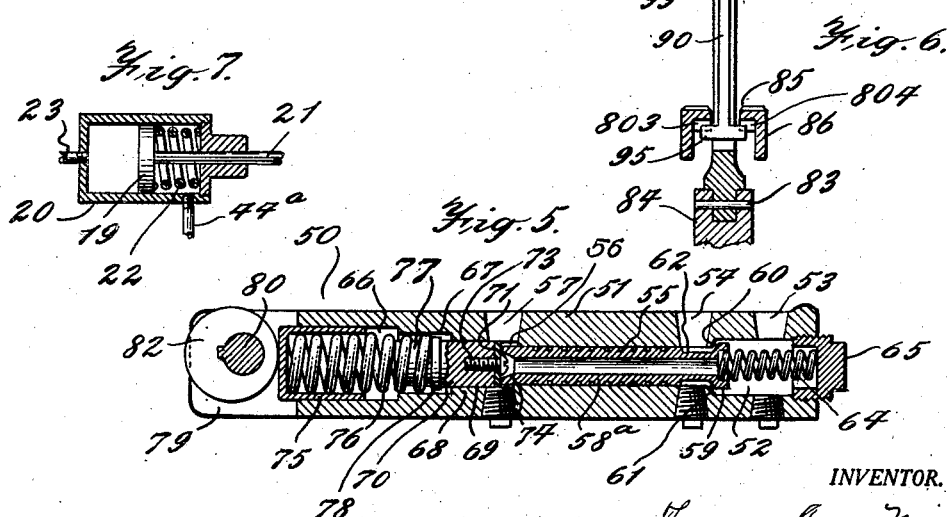
INVENTOR.
BY Thomas Spencer Miller
Gifford & Scull
his ATTORNEYS

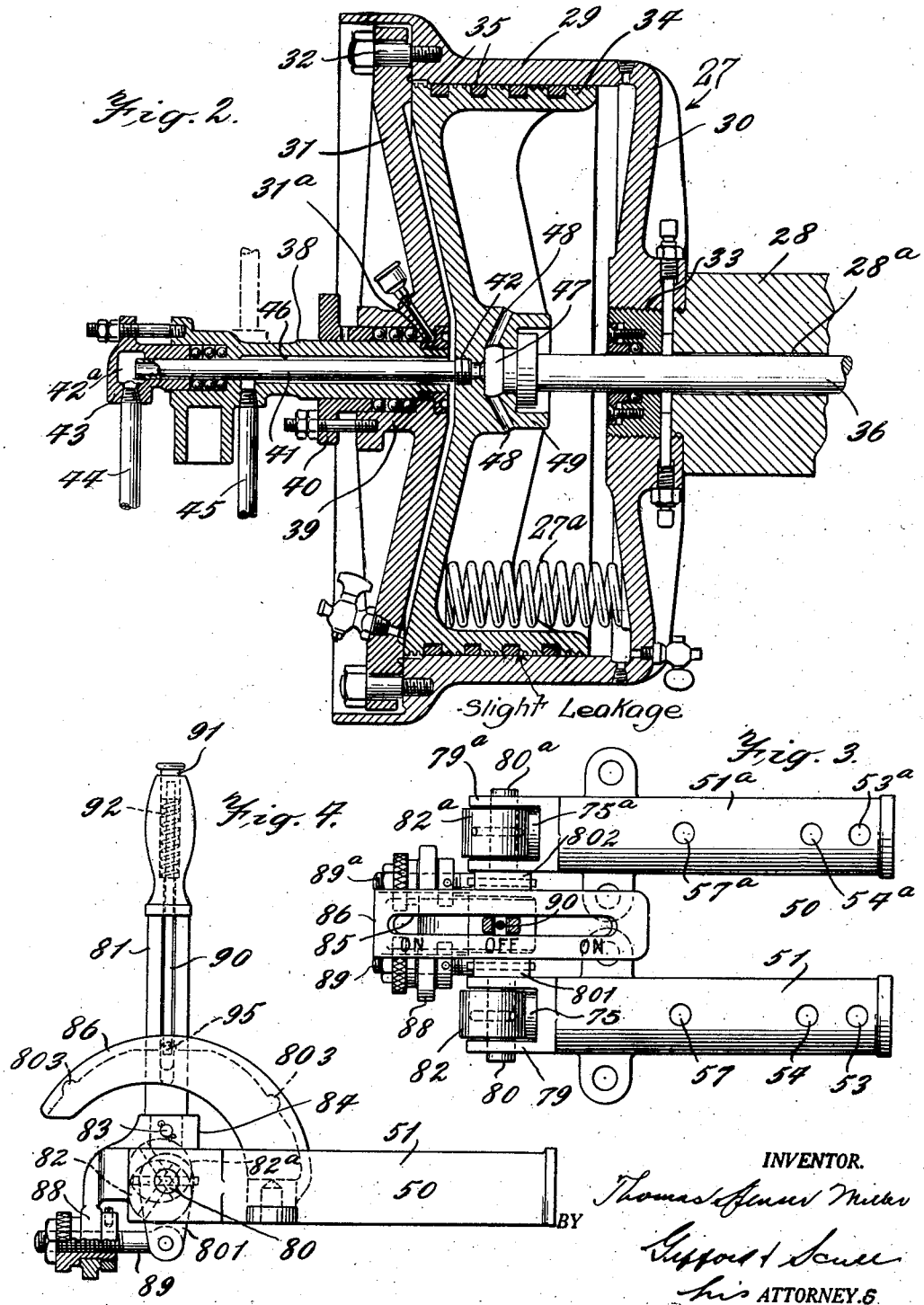

Patented Sept. 11, 1928.

UNITED STATES PATENT OFFICE.

THOMAS SPENCER MILLER, OF SOUTH ORANGE, NEW JERSEY.

FLUID-PRESSURE-OPERATED DEVICE.

Application filed August 1, 1924. Serial No. 729,462.

I have illustrated in the accompanying drawings one form of apparatus embodying one feature of my invention, and by which the method may be carried out.

My invention will be best understood by reference to the accompanying drawings, in which Fig. 1 is a perspective view illustrating my invention in connection with a fluid pressure operated clutch and a fluid pressure operated brake; Fig. 2 is a longitudinal section through a fluid pressure operated device formed and operated in accordance with my invention; Fig. 3 is a plan view of the two valve members controlling the fluid under pressure to the respective fluid pressure operated devices; Fig. 4 is a side view of Fig. 3; Fig. 5 is a sectional view through one of the valve members controlling the fluid pressure to the fluid pressure operated device; Fig. 6 is a sectional view through the operating handle for one of the valves, and Fig. 7 is a sectional view through the fluid pressure operated device illustrated in Fig. 1 which actuates the brake.

Like reference characters indicate like parts throughout the drawings.

In Fig. 1, I have illustrated my invention in connection with a fluid pressure operated friction device, illustrated generally at 10, and a fluid pressure operated friction brake, as at 11, associated with a hoisting drum 12. The drum 12 is provided with a flange 13 which is engaged by the friction band 14. One end of the friction band 14 is connected by means of a bolt 15, between the ends of two arms 16 secured on a shaft 17, having its bearings in the frame 18 of the device. The shaft 17 is rocked by an arm 18ª secured on the end thereof and operated by a piston 19 in a cylinder 20, the piston being connected to the end of the arm 18ª by a piston stem 21. The movement of the piston 19 to the right, as viewed in Figs. 1 and 7, rocks the shaft 17 in a direction to apply the friction brake. The movement of the piston 19 to the right by steam pressure is resisted by an expansion spring 22, which tends to move the piston to the left. Steam is admitted to the left end of the cylinder 20 through a steam supply pipe 23. An operating gear 24 is provided with a friction cone 25 with which engages a friction member 26 on the flange 13.

The friction device 10 is operated by a fluid pressure operated device, indicated generally at 27. The drum 12 is longitudinally movable on the shaft 28. The fluid pressure operated device 27 illustrated, comprises a cylinder 29 closed at one end by a plate 30, which may be integral with the cylinder and at the opposite end by a removable plate 31 secured to the cylinder as by bolts 32. The cylinder 29 is, in the form illustrated, secured to the end of the shaft 28 by a screw-threaded connection 33. Within the cylinder 29 is a piston 34 preferably provided with packing rings 35. The left end of a thrust pin 36, as viewed in Fig. 2, engages the piston 34. The pin 36 is preferably arranged axially of the shaft 28, on which the drum is mounted, in an opening 28ª in the shaft, and engages a cross key 37 arranged in a slot transversely of the shaft in a known manner, the key 37 engaging the drum at the left so that a movement thereof to the right forces the drum to the right and the friction member 26 thereon into engagement with the friction member 25 on the gear 24. Movement of the piston 34 to the right is resisted by a plurality of springs 27ª (only one of which is shown in Fig. 2), which are interposed between the piston and the right hand end of the cylinder 29 and tend to move the piston to the left, as viewed in Fig. 2. As the cylinder 29 is secured on the shaft 28 on which the gear 24 is also secured, the cylinder (with the piston) normally rotates.

In accordance with one feature of my invention, novel means are provided for supplying steam to the cylinder 29 and for exhausting leakage steam therefrom. It has been found in practice that a considerable amount of steam leaks past the piston into the cylinder beyond the piston. It has hitherto been proposed to provide a hole in the back of the cylinder to remove such leakage steam. The presence of this steam, however, in the space occupied by the operator clouded his vision and caused annoyance. In accordance with my invention, the steam leaking past the piston and into the cylinder is conducted to a point remote from the space occupied by the operator and where its presence cannot interfere with his vision, or otherwise interfere with his work. In the embodiment of my invention illustrated, a tubular member 38 is attached to and forms a tight fit within the opening 31ª in the middle portion of the end plate 31, the connections being such as to permit relative rotary movement between the tubular member 38 and the cylinder, the tubular member being stationary and the cylinder being rotary, as already stated. The end plate 31 is preferably provided with an outwardly extending central flange 39 spaced from the tubular member 38, and in which is received a stuffing box 40. Within the tubular member 38 and spaced therefrom for the major portion of the latter, as illustrated in Fig. 2, is a tube 41, the inner end of which is screwed into and made fast to the piston as by a screw-threaded joint 42. The outer end of the pipe 41 communicates with a chamber 42ª, formed in a head or casing 43, and with which also communicates a pipe 44 which leads to a point remote from the space occupied by the operator and preferably to an ash pit of the boiler. This pipe 44 is diagrammatically illustrated in Fig. 1 as leading beyond a partition 45ª to a space 46ª, the space occupied by the operator being indicated generally at 47ª.

Steam is preferably supplied to the cylinder by a steam supply pipe 45 which communicates with the annular space 46 between the tubular member 38 and the pipe 41, said annular space leading to the cylinder 29. The pipe 41 communicates with the portion of the cylinder at the right of the piston 34 by means of a chamber 47 and radial passages 48 leading from said chamber through the hub 49 on the piston. Any steam, therefore, which leaks past the piston into the cylinder flows through the passages 48, chamber 47, pipe 41, chamber 42ª and pipe 44 to the space beyond the operator. An outlet pipe 44ª is connected to the cylinder 20 and carries the leakage steam therefrom to a point remote from the operator. If an insufficient amount of steam flows past the piston to preheat the cylinder and prevent condensation of steam, a piston ring may be removed or the piston may be provided with a small opening in the head.

Not only is the steam which leaks past the piston led to a point remote from the space occupied by the operator, but in accordance with my invention, steam or other heated fluid under pressure is normally admitted to the cylinder in an amount which is insufficient to operate the piston against the resistance offered by the springs 27, but sufficient in amount to maintain the cylinder and the piston, through leakage, in a warm condition and to prevent condensation of steam in the cylinder.

The valve members, indicated generally in Fig. 1 by the reference characters 50 and 50ª, which control the supply of fluid under pressure to the respective cylinders 20 and 29 will now be described. Both valve members are, or may be the same in construction and operation, and the description of one will suffice for both. The valve member 50 comprises a valve casing 51 provided with a chamber 52 with which a port 53 communicates, the supply pipe 23 for the fluid pressure operated device 20 being connected to said port 53. The valve casing is also provided with a port 54 also communicating with the chamber 52 and by means of which fluid under pressure is supplied through the chamber 52 and port 53 to the supply pipe 23. The valve casing is also provided with a longitudinal bore 55, which, at one end, communicates with said chamber 52 and at the other end opens into an exhaust or relief chamber 56 which opens to the atmosphere through a port 57 and pipe 58. Slidably disposed in the bore 55 is a cylindrical hollow valve member 58ª, the bore of which opens at one end into the chamber 52, while the opposite end thereof opens into the relief chamber 56. The right hand end of the valve member 58ª, as viewed in Fig. 5, projects into the chamber 52 and is provided with a valve head 59, preferably provided with a conical face 60, adapted to cooperate with a valve seat 61 formed at the juncture of the chamber 52 with the bore 55. The valve member 58ª is provided near the head 59 with an annular peripheral groove 62. The parts controlling and operating the valve member 58ª are preferably constructed and arranged normally to maintain the valve head 59 slightly spaced from the seat 61 on the casing, as illustrated in Fig. 5, so as normally to admit a small amount of steam from the supply pipe to the fluid pressure operated device, and when the valve is entirely unseated, the pressure medium flows freely from the port 54 through the groove 62 and thence into the chamber 52 and out through the port 53 and pipe 23 to the fluid pressure operated device 20. The valve is normally moved towards its seat by an expansion coil spring 64 located in the chamber 52, and the ends of which abut respectively against the end of the valve member 58ª and a head 65, which is preferably screwed into and closes the end of the casing 51. At the end of the casing 51 opposite that containing the chamber 52, is a bore 66, preferably larger than the bore 55, with a contracted portion at 67 concentric with the bore 55 and which is separated therefrom and from the relief port 57 by a wall 68, provided with a central circular opening 69 in which is slidably disposed a cylindrical valve block 70, preferably of a length greater than the thickness of said wall 68. One end of the member 70 is provided with a valve seat 71, against which the valve member 58ª is seated, and which is preferably secured to the member 70 by a screw 73. The end of the bore through the valve member 58ª adjacent to the seat 71 is preferably flared, as indicated at 74.

Located in the bore 66 of the valve casing is a hollow piston or head 75, open at one end and closed at the other end. A coil spring 76 is partially enclosed in the piston 75 and seated at one end against the end wall of the piston, while the opposite end thereof surrounds a head or plunger 77, preferably provided at one end with a flanged head or collar 78, against which the opposite end of the spring 76 is seated, and which engages the end of the member 70, the spring 76 normally exerting its expansive force to push the member 70 to the right, as viewed in Fig. 5, into engagement with the adjacent end of the valve member 58$^a$ with a valve seat 71. The left end of the valve casing, as viewed in Figs. 1 and 5, is provided with spaced ears or lugs 79, 79$^a$ having bearings in which rotate two operating shafts, one of which is illustrated at 80 and the other of which is not illustrated but which it is understood may be the same as the shaft 80. A cam 82 is secured on the shaft 80 and engages the closed end of the piston 75 to compress the spring 76 to a greater or less extent.

I have applied to the valve member 50$^a$ the same reference characters to parts corresponding to those of the valve member 50, but with the letter $a$ appended. A cam 82$^a$ is mounted on its shaft having its bearings in the ears 79$^a$ of the valve casing 50$^a$ in the same or similar manner as the corresponding parts described in connection with the valve member 50.

Preferably both of the valves are simultaneously operated by manual means, operated either by the hand or foot, and here illustrated as a hand lever 81, in a manner which will now be described. The handle is mounted on a body portion 84 to which it is secured by a pin 83, and passes through and is guided by a slot 85 in a stationary quadrant 86. On the lower portion of the handle is mounted a member 87 (Fig. 1) flared outwardly as indicated in Fig. 1, into a flange 88 by means of which both cams 82 and 82$^a$ are simultaneously operated by the movement of the handle 81 and generally in reverse directions. On the shafts 80 and 80$^a$ are secured arms 801 and 802 connected to the flange 88 by bolts 89 and 89$^a$, which pass through openings in said flange, so that the operation of the hand lever 81 simultaneously rotates both cam members 82 and 82$^a$, and preferably in opposite directions, as stated. The handle is provided with a rod 90 extending longitudinally thereof and provided at its outer end with a plunger 91, by which the rod may be depressed, a coil spring 92 being interposed between the head 91 and the shoulder 93 formed at the lower end of a longitudinal opening 94 in the handle. The lower end of the rod 90 is provided with a latch member which extends laterally from the handle and rides along the lower faces of the two sides of the quadrant, as best shown in Fig. 6. The quadrant is provided preferably on both sides with notches or openings 803 and 804 (Fig. 4) within which notches the latch 70 is adapted to lock the handle in any desired position. It will, of course, be understood that any desired number of said notches may be employed.

Generally, the cams 82 and 82$^a$ will be so mounted on their shafts that the cam portions will be oppositely directed. With the parts so arranged, when the handle is in the middle or neutral position, the cams 82 and 82$^a$ may be so adjusted on their shafts that both valves will be only slightly open to admit steam to the respective cylinders in an amount sufficient to maintain the cylinders and pistons, through leakage, in a warm condition, but insufficient in amount to operate the pistons. Assume, for example, that the parts are set to maintain at this time a pressure of five pounds in the cylinders. Considering the valve member 50, shown in Fig. 5, in case the pressure in the cylinder 20 builds up to an amount above five pounds, then the pressure of the steam against the valve seat 71 will force this valve seat and the member 70 toward the left against the action of the spring 76. (It must be understood that the pressure in the hollow portion of valve 58$^a$ is always the same as that in cylinder 20). At the same time, valve member 58$^a$ is forced to the left aided by spring 64, thereby seating the valve head 59 against the seat 61 and closing communication from the source of fluid pressure supply. Excess steam is then exhausted from the cylinder 20 (until the pressure therein is brought back to the desired five pounds) because the spring 76 under a higher pressure than five pounds, yields and forces the member 71 to the left thereby permitting the excess pressure to be exhausted through port 57.

On the other hand, in the event that the steam pressure in the cylinder 20 falls below five pounds, then the steam pressure against the valve seat 71 being lessened, the spring 76 forces the member 70 and the valve seat 71 to the right, as viewed in Fig. 5, thereby opening the valve and permitting steam to pass through the port 54 by the valve seat 61 into chamber 52 and to the port 53 (leading to the cylinder 20), thereby building up the pressure to the desired five pounds. In other words, when the parts are set at a predetermined pressure, then any building up of pressure in the cylinder substantially above that in which the valve is set, causes the excess steam to exhaust from the cylinder through port 57. Any substantial reduction of the steam pressure in the cylinder below the desired amount causes the valve head 59 to be opened further, increases the flow of steam from the supply pipe to the cylinder, thereby bringing the pressure back to the desired amount. It is to be understood that the function of the spring 64 is merely to push the valve member 58 to the left and hold the valve head 59 against its seat especially when there is no pressure in chamber 52. There is no necessary relation between the relative strength of this spring 64 and that of the spring 76, except that it is far weaker than the spring 76. When the handle 81 is moved in one direction, as to the left, as viewed in Fig. 1, the cam 82 will be rotated anti-clockwise, as viewed in Fig. 4, and move its piston 75 to the right which, in turn, moves the valve member 58$^a$ to the right against the action of the spring 64 to open the same and admit more fluid under pressure from the supply pipe 95, port 54, through the groove 62, chamber 52 and port 53 to the pipe 23, leading to the cylinder 20. At the same time, the other cam 82$^a$ will be further moved away from its piston 75$^a$ thereby retaining the valve member 58$^a$ in the nearly closed position, and in the position indicated in Fig. 5. When the cam member 82 is rotated anti-clockwise as viewed in Fig. 5, and the valve member 58$^a$ thereby moved to the right in the manner described, the additional fluid pressure admitted to the cylinder 20 causes the piston to be actuated, and the device is set at a given pressure depending upon the position of the lever 81, for example, if it is desired to operate the device, and maintain the steam pressure in the cylinder 20 at 150 pounds, then the lever will be moved to a corresponding position. Then any increase in steam pressure above the desired 150 pounds will result in the operation of the valve seat 71 against the spring 76 and the closing of the valve head 59 against its seat 61 in the same manner as described above in connection with the minimum pressure which was assumed to be five pounds. The excess pressure in the cylinder 20 will thereby be exhausted through the valve member 58$^a$ and the port 57 until the pressure is brought down to the desired 150 pounds when the spring 76 will again move the member 70 and the valve member 58 to the right. Similarly, in case the pressure falls below 150 pounds, the spring 76 will push the member 70 and the valve member 58$^a$ to the right (since the pressure against the valve seat 71 is now decreased), and thereby more fully open the passage leading from the source of steam supply past the valve head 59 and to the steam cylinder, and this will continue until the steam pressure has again built up to the desired 150 pounds. The operation of the valve member 58$^a$ and the associated parts will, of course, be the same for intermediate pressures.

On the other hand, when the handle 81 is moved to the right, as viewed in Fig. 1, the cam 82$^a$ is rotated clockwise to move the associated piston 75 to the right and similarly open communication between the supply pipe 95 and the pipe 45 to admit fluid under pressure to the cylinder 29, the other valve of the valve member 58 remaining nearly closed during this operation. Not only does the valve member 51 (51$^a$) illustrated control the admission of fluid under pressure to the fluid pressure operated device, but it can be made to control the exhaust of fluid pressure therefrom. This may be done by operating the lever 81 in such a direction that the tension on the spring 76 is weakened. This will cause the pressure medium which acts through the hollow valve 58$^a$ upon the member 70 to depress the member, thereby permitting the pressure medium to exhaust through the port 57 and the pipe 58 (Fig. 1). By so controlling the exhaust of fluid pressure, slippage either of the friction device or of the brake device can be secured. The control of the exhaust is desirable, for example, in a high lead yarding system where the logs are hauled from a distance to a point near the spar or tree. As the log approaches, it is elevated. By slipping the friction, the log is easily dropped without jar to the rigging. In the absence of the control of the exhaust, the log would be permitted to drop suddenly, thereby causing whipping of the spar and a general wrenching and strain on the rigging.

By normally admitting a limited amount of steam to the respective cylinders, and in an amount insufficient to operate the pistons, the cylinders and the pistons are maintained in a warm condition through leakage of the steam. When the cylinder is cold, there may be a delay of several seconds after the operator's valve is open before the drum is thrown over into contact with its driving gear or before the friction brake is properly applied. But when the cylinder, piston and pipes are well heated up, the application takes place in a fraction of a second, which, of course, is highly advantageous, particularly where the fluid pressure operated device is used in connection with hoisting or logging apparatus and other similar apparatus where the fluid pressure operated device should promptly be applied. So long as there is a circulation of steam passing through the pipe and cylinder, the cylinder and associated parts are maintained at the required temperature so that the device to which the piston is connected may properly be operated. Preferably, the pistons are so constructed and arranged, by applying a less number of packing rings than have hitherto commonly been used, so as to permit a limited amount of leakage normally to take place. Furthermore, by normally admitting a limited amount of steam continuously to the cylinder and thus preheating the same, condensation in the cylinder is prevented, and delays in application are reduced.

Briefly stated, when the manually operated lever 81 is thrown hard over to the right, steam enters freely into one of the cylinders to operate the piston and when it is thrown hard over to the left, steam is freely admitted to the other cylinder to operate its piston. When the lever is in its neutral position, the valves are preferably so adjusted and arranged that there is steam pressure in both cylinders of say, five pounds, where the operating pressure may be 100 to 150 pounds, the small steam pressure being sufficient to force a circulation of steam around the piston, filling the cylinder and out through the pipe system and thus maintaining the heat in the cylinders and preventing condensation. Under these conditions, whenever it is desirable to operate either the brake or the friction device, the operation will take place in a fraction of a second, rather than taking place in several seconds of time, as has been common.

It has been found in practice that a new cylinder and piston even provided with three or four piston rings, and of ordinary machine construction, leaks sufficiently to satisfy the demand for sufficient steam to preheat the cylinder. This fact is common to all steam pistons which only become relatively steam tight through the normal process of "wearing in". After a long period of wear, in case the leakage is insufficient, the operator will increase this leakage by any well known expedient, as, for example, by the removal of one of the piston rings.

While I have illustrated my invention in connection with a fluid pressure operated friction device and a fluid pressure operated brake, it will, of course, be understood that the same is not limited thereto and is applicable to the operation of either of these devices, singly, or, in fact, to the operation of any fluid pressure operated device where the heated fluid under pressure is admitted to the cylinder to actuate a piston and operate the device, and the release of the fluid pressure causes the piston to move in the opposite direction to release the device.

I claim:—

1. In combination, a fluid pressure operated device comprising a cylinder and piston, the piston being constructed and arranged to permit steam normally to leak past the same in sufficient amount to maintain the cylinder heated, a control therefor located in a space occupied by the operator, means for normally admitting to the cylinder steam sufficient in amount to warm the same but insufficient to operate said device, and means for conducting the steam leaking past said piston to a point remote from the space occupied by the operator.

2. In combination, a fluid pressure operated device comprising a cylinder and its piston, the piston being constructed and arranged to permit steam normally to leak past the same in sufficient amount to maintain the cylinder heated, a device operated by said piston in one direction of movement and released by movement thereof in the opposite direction, a pipe connected to the central portion of said piston and arranged axially with said cylinder and communicating with the side of the piston remote from that side to which steam is admitted and leading to exhaust, and means providing an annular space around said pipe through which steam is admitted to said cylinder.

3. In combination, a fluid pressure operated device comprising a rotary cylinder and its piston, the piston being constructed and arranged to permit steam normally to leak past the same in sufficient amount to maintain the cylinder heated, a device operated by said piston in one direction of movement and released by movement thereof in the opposite direction, a pipe connected to the central portion of said piston and arranged axially with said cylinder and communicating with the side of the piston remote from that side to which steam is admitted and leading to exhaust, and means providing an annular space around said pipe through which steam is admitted to said cylinder.

4. In combination, a fluid pressure operated device comprising a cylinder and its piston, the piston being constructed and arranged to permit steam normally to leak past the same in sufficient amount to maintain the cylinder heated, a control device therefor located in a space occupied by the operator, a device operated by said piston in one direction of movement and released by movement thereof in the opposite direction, a pipe connected to the central portion of said piston and arranged axially with said cylinder and communicating with the side of the piston remote from that side to which steam is admitted and leading to exhaust, and means for conducting the steam leaking past the piston to a point remote from the space occupied by the operator.

5. In combination, a fluid pressure operated device comprising a cylinder and its piston, the piston being constructed and arranged to permit steam normally to leak past the same in sufficient amount to maintain the cylinder heated, a control device therefor located in a space occupied by the operator, a device operated by said piston in one direction of movement and released by movement thereof in the opposite direction, a pipe connected to the central portion of said piston and arranged axially with said cylinder and communicating with the side of the piston remote from said cylinder, means for conducting the steam leaking past the piston to a point remote from the space occupied by the operator, and means providing an annular space around said pipe through which steam is admitted to said cylinder.

6. In combination, a fluid pressure operated device comprising a piston and cylinder, the piston being constructed and arranged to permit steam normally to leak past the same in sufficient amount to maintain the cylinder heated, a source of fluid under pressure, a conduit for conducting said fluid to said cylinder, a valve member interposed within said conduit for controlling the flow of fluid to said cylinder and constructed and arranged in one position to admit to the cylinder steam sufficient in amount to maintain the heat of the same by leakage past the piston, but insufficient to operate said device, and in another position to admit to said cylinder steam sufficient in amount to operate said device, and means for operating said valve to either of said positions.

7. In combination, a fluid pressure operated device comprising a cylinder and its piston, the piston being constructed and arranged to permit steam normally to leak past the same in sufficient amount to maintain the cylinder heated, yielding means resisting the movement of said piston in one direction, a source of fluid under pressure, a conduit for conducting said fluid to said cylinder, a valve member interposed in said conduit for controlling the flow of fluid to said cylinder and constructed and arranged in one position to admit to the cylinder steam sufficient in amount to maintain the heat of the same by leakage past the piston, but insufficient to operate said device by movement of the piston against the force of said yielding means, and in another position to admit to said cylinder steam sufficient in amount to operate said device by movement of the piston against said yielding means, and means for operating said valve to either of said positions.

8. In a single acting fluid pressure operated device comprising a piston and cylinder, the piston being constructed and arranged to permit steam normally to leak past the same in sufficient amount to maintain the cylinder heated, a source of fluid under pressure, a conduit for connecting said fluid to said cylinder at one side of said piston and to push the same in one direction only, a valve member interposed within said conduit for controlling the flow of fluid to said cylinder and constructed and arranged in one position to admit to the cylinder steam sufficient in amount to maintain the heat of the same by leakage past the piston, but insufficient to operate said device, and in another position to admit to said cylinder steam sufficient in amount to operate said device, means for operating said valve to either of said positions, and means comprising a separate continuously open conduit for leading the steam so leaking past the piston to a point where the vapor of said steam may not cloud the vision of the operator of said device.

9. In combination, a fluid pressure operated device comprising a cylinder and piston, the piston being constructed and arranged to permit steam normally to leak past the same in sufficient amount to maintain the cylinder heated, a control therefor located in a space occupied by the operator, means for normally admitting to the cylinder steam sufficient in amount to warm the same but insufficient to operate said device, and means for conducting the steam leaking past said piston from the cylinder.

THOMAS SPENCER MILLER.